F. J. KNORR.
HOSE CLAMP.
APPLICATION FILED JAN. 24, 1920.

1,390,564.

Patented Sept. 13, 1921.

Frederick J. Knorr, Inventor
By his Attorney
Geo. L. Wheelock

UNITED STATES PATENT OFFICE.

FREDERICK J. KNORR, OF NEW YORK, N. Y., ASSIGNOR TO MARGARET R. ELKIN, OF NEW YORK, N. Y.

HOSE-CLAMP.

1,390,564.  Specification of Letters Patent.  Patented Sept. 13, 1921.

Application filed January 24, 1920. Serial No. 353,650.

*To all whom it may concern:*

Be it known that I, FREDERICK J. KNORR, a citizen of the United States, residing at New York, N. Y., have invented certain new and useful Improvements in Hose-Clamps, of which the following is a specification.

This invention relates to hose clamps, or means for attaching two conduits together as, for instance, a water delivery faucet and a rubber hose, one of the objects of the invention being to provide a cheap construction which is, at the same time, both efficient and serviceable. Another object of the invention is to provide as few parts as possible, so that the assembling of the parts of the clamp may be expeditiously performed. Another object of the invention is to provide a special hinge joint for each of the clamping jaws, so that a frail construction of the joint is avoided, as by dispensing with hinge pins.

These being among the objects of the present invention, the same consists of certain features of construction and combinations of parts to be hereinafter described, and then claimed with reference to the accompanying drawings illustrating a preferred embodiment of the invention, and in which—

Figure 1:
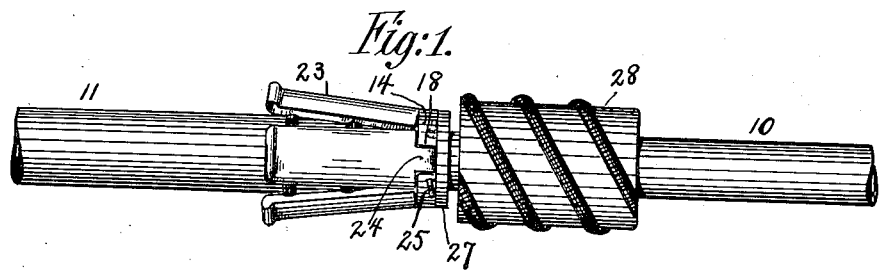
Figure 1, is a side elevation of a hose clamp connecting two conduits, the clamping jaws being unlocked.
Figure 2:
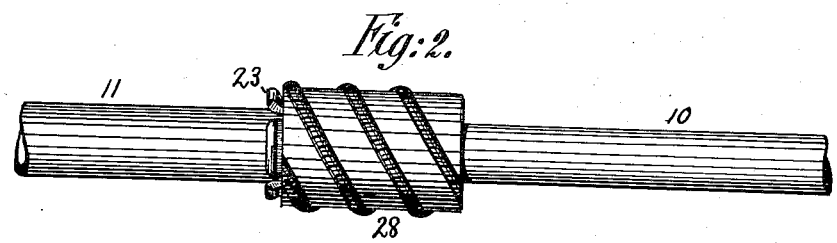
Fig. 2, is a similar side elevation, except that the clamping jaws are secured in locked position.

Referring to the drawings, it will be assumed that a conduit 10, in the form of a metal pipe, is to have a conduit 11, in the form of a hose, coupled with it. To facilitate a firmer grip of the hose clamp on the conduits to be attached, the pipe 10 is preferably provided with an annular bead or abutment 12, and with additional beads 13, by means of which beads a greater hold of the hose 11 upon the pipe 10 is assured.

Figure 5:
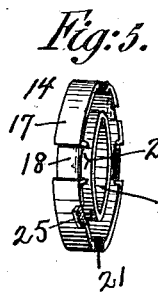
Fig. 5, is a perspective view of the preferred form of collar on which the clamping jaws are mounted.
Figure 4:
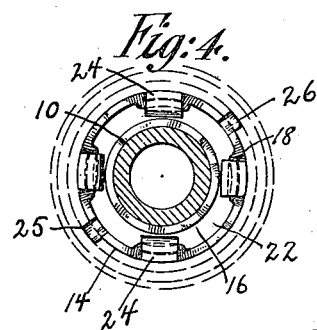
Fig. 4, is a transverse section on the line 4—4, Fig. 3, the locking member being shown only in broken lines.
Figure 6:
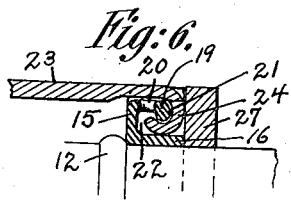
Fig. 6, is an enlarged section in the plane of Fig. 3, showing a slight modification.

The novelty of the invention resides in the means for attaching the two conduits together, whether or not beads or other means, such as 12, 13, are provided. In the preferred form of the invention a collar 14 is provided, which is struck up from sheet metal, and preferably has a channel formation; that is to say, it is substantially U-shaped in cross section in a plane parallel with the axis through the opening of the collar. So constructed, the collar has an intermediate web 15, and flanges 16 and 17, located respectively at the inner and the outer peripheries of said web. As shown more clearly in Figs. 4 and 5, recesses 18 are formed in the outer surface of the outer flange 17 of the collar, these recesses being, for example, four in number and equally spaced apart. At the bottoms of these recesses the metallic collar is deformed, so that hook portions 19 are provided, which lie in the path of the channel of the collar; or otherwise stated, the said hook portions 19 are arranged in a series which is concentric with the outer and inner peripheries of the collars, so as to be located between them. It may be desirable in some cases to provide holes 20, in the flange 17, which are located at the bottoms of the recesses 18, just back of the hook portions 19, as shown in Fig. 6. The edge of the outer flange 17, directly opposite the hook portions 19, is provided with notches 21, for a purpose to be presently mentioned. The channel is designated by 22.

The described construction or the equivalent for the collar 14 is preferred, because, in the best form of the invention no hinge pins are employed, and the described collar affords convenient and practical means for assembling and connecting the clamping jaws 23 therewith. The clamping jaws correspond in number with the peripheral recesses 18 of the collar, and they are preferably formed of sheet metal, having a semicircular cross section. As shown more clearly in Figs. 1, 3 and 6, each clamping jaw 23 is provided at its inner end with a relatively narrow extension which is so bent up as to form a hook 24. Each hook 24 may be engaged in the channel 22 of the collar in such way that each hook will be located in a peripheral recess 18, and in an adjacent notch 21. With this construction of hinge joint between each jaw and the collar, no hinge pins, as such, need be employed, and when the jaws are assembled with the collar the hooks thereof will be substantially flush with the surfaces of the collar, and not protrude therefrom. In the construction shown in Figs. 1 and 3, the clamping jaws are permitted to swing outwardly more or less, but in Fig. 6 each jaw may have a greater swinging motion, due to the fact that the end of the hook may pass into the hole 20.

The clamping jaws having been assembled with the collar 14, the assembled parts may be applied to a pipe as 10, and held thereon in a suitable way, so that a locking member may be employed to lock the jaws upon a part, such as a hose 11. The preferred construction to permit of this preferably includes a pair of lugs or ribs 25, 26, which are formed integrally with the outer periphery of the collar at diametrically opposite sides thereof, and extending in opposite directions. These lugs 25, 26, are each disposed at a screw pitch, so that, in effect, they form screw threads on the collar, which may be said to be segments of a circle. An assembled collar and jaws, such as referred to, and in which there is a hole in the collar of a size to fit snugly over the pipe 10, is now placed upon said pipe, with the web side 15 of the collar placed in close contact with the rib or abutment 12 on the pipe 10. A ring 27 is now shrunk upon the pipe 10, so as to form an annular flange thereon, between which and the abutment 12, the said collar 14 is firmly held. As there is sufficient play of the hooks on the jaws in the recesses and channel which receive the said hooks, so as to permit the jaws to be swung outwardly, as on hinge joints, the placing of the ring 27 on the pipe 10 will not interfere with the proper amount of hinge movement for each jaw.

Figure 3:
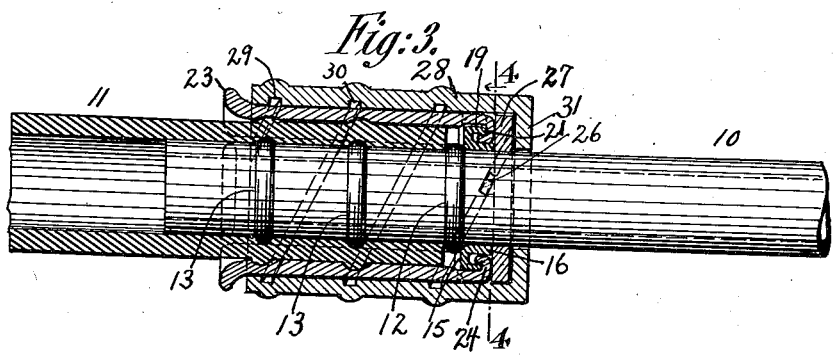
Fig. 3, is an enlarged longitudinal central section through Fig. 2.

There is also placed over the pipe 10, a locking member, preferably in the form of a sleeve 28, which is composed of sheet metal, if that be preferable, and said locking sleeve is preferably provided with internal screw threads 29 and 30, to correspond with the two screw thread portions 25, 26, on the collar. Preferably the said locking sleeve is provided at its outer end with a stop flange 31, which is adapted to abut against the flange 27. The locking sleeve 28 is of such internal diameter that when it is forced over the jaws 23, it will force the jaws 23 into firm clamping engagement with the hose 11, and bind the hose in firm engagement with the pipe 10. Peferably, as shown in Fig. 3, the free ends of the jaws may be flared slightly outwardly, so that when the locking member is forced to its final position, its end will bear upon the said ends of the jaws and more firmly press the jaws into engagement with the hose 11.

It will be seen that the described construction of hose attaching or clamping means may be of the simplest kind, and that all the parts may be formed of sheet metal, being struck up by dies. The parts may be conveniently assembled and arranged upon the two conduits to be connected. It will furthermore be seen that the segmental threads 25, 26, on the collar are not readily broken, as they furnish long bearing surfaces for the corresponding threads upon the locking member or sleeve 28. Many advantages will be apparent to those who have the necessity for the use of such attaching devices as the one described herein.

It is obvious that the invention is susceptible of various modifications, and I do not desire to limit myself in this respect, except as defined by the scope of the appended claims.

What I claim as new is:

1. A hose clamp comprising the combination with a tube, of a channeled collar fitting said tube, a series of clamping jaws having hinged connections with said collar, one or more lugs on said collar, and a sleeve inclosing said jaws and collar and having one or more internal screw threads engaged by said lug or lugs.

2. A hose clamp comprising the combination with a tube, of a channeled collar fitting said tube, a series of clamping jaws having hinged connections with said collar, one or more lugs on said collar, and a sleeve inclosing said jaws and collar and having one or more internal screw threads engaged by said lug or lugs, said tube having a bead against which said collar abuts.

3. A hose clamp comprising the combination with a tube, of a collar fitting said tube, a series of clamping jaws having hinged connections with said collar, one or more lugs on said collar, and a sleeve inclosing said jaws and collar and having one or more internal screw threads engaged by said lug or lugs, said collar being of channel form in cross section and having peripheral recesses receiving arms on said clamping jaws.

4. In a hose-clamp, a collar of channel cross-section, and having a plurality of hook-like portions, and a plurality of jaws having hooks engaged over said portions, whereby said jaws are hingedly connected with said collar, the edge of the outer portion of said channeled collar having notches continued from said hook-like portions to permit engagement by said hooks.

5. In a hose-clamp, a collar having a plurality of hook-like portions, and a plurality of jaws having hooks engaged over said portions, whereby said jaws are hingedly connected with said collar, the outer surface of said collar, at points over said hook-like portions being recessed to receive said hooks.

6. A hose clamp comprising the combination with a tube, of a channeled collar fitting said tube, clamping arms having hooked portions engaging hooked portions of said collar, and a sleeve inclosing said arms and collar and having screw engagement with the latter.

7. In a hose-clamp, the combination of a collar provided with an outward integral lug and having a plurality of hook-like portions, a plurality of jaws having hooks engaged over said portions, whereby said jaws are hingedly connected with said collar, and a sleeve for fitting over said collar and jaws, and having engagement with said lug for locking said jaws in their inward position.

8. In a hose-clamp, the combination of a collar provided with an outward integral lug with a screw-pitch and having a plurality of hook-like portions, a plurality of jaws having hooks engaged over said portions, whereby said jaws are hingedly connected with said collar, and a sleeve for fitting over said collar and jaws, and having an internal screw-thread for engagement with said lug for locking said jaws in their inward position.

9. In a hose-clamp, the combination of a collar provided with an outward integral lug with a screw-pitch and having a plurality of hook-like portions, a plurality of jaws having hooks engaged over said portions, whereby said jaws are hingedly connected with said collar, and a sleeve for fitting over said collar and jaws, and having an internal screw-thread for engagement with said lug for locking said jaws in their inward position, all of said parts being composed of stamped-up sheet metal.

10. In a hose-clamp, the combination of a tube having a nipple extremity and an abutment at the base of the nipple, a collar placed over said tube, a plurality of jaws hinged on said collar to swing toward said nipple, and an annular flange shrunk on said tube in close contact with said collar to hold the collar against said abutment.

11. In a hose-clamp, the combination of a tube having a nipple extremity and an abutment at the base of the nipple, a collar placed over said tube, a plurality of jaws hinged on said collar to swing toward said nipple, and an annular flange shrunk on said tube in close contact with said collar to hold the collar against said abutment, all of said parts being composed of stamped-up sheet metal.

12. In a hose-clamp, the combination of a tube having a nipple extremity and an abutment at the base of the nipple, a collar placed over said tube, a plurality of jaws hinged on said collar to swing toward said nipple, and an annular flange shrunk on said tube in close contact with said collar to hold the collar against said abutment, said abutment having a screw-pitch, and a sleeve for fitting over said collar and having an internal screw-thread for engagement with said lug, whereby said jaws are forced toward said nipple to clamp a hose.

13. In a hose-clamp, the combination of a tube having a nipple extremity and an abutment at the base of the nipple, a collar placed over said tube, and having a plurality of hook-like portions, a plurality of jaws having hooks engaged over said portions, whereby said jaws are hingedly connected with said collar, an annular flange on said tube secured in close contact with said collar to hold the collar against said abutment and also to hold the jaw-hooks in position, and a locking sleeve for fitting over said collar and jaws.

14. In a hose-clamp, the combination of a tube having a nipple extremity and an abutment at the base of the nipple, a collar placed over said tube, and having a plurality of hook-like portions, a plurality of jaws having hooks engaged over said portions, whereby said jaws are hingedly connected with said collar, an annular flange on said tube secured in close contact with said collar to hold the collar against said abutment and also to hold the jaw-hooks in position, and a locking sleeve for fitting over said collar and jaws, all of said parts being stamped-up from sheet metal.

15. A hose-clamp, comprising a channeled peripherally recessed collar of sheet metal.

16. A hose-clamp, comprising a channeled peripherally recessed collar of sheet metal, having hook-like portions back of the recesses.

FREDERICK J. KNORR.